United States Patent [19]

Duncan et al.

[11] 4,045,172

[45] Aug. 30, 1977

[54] TEXTILE SOIL RELEASE COMPOSITION AND METHOD

[75] Inventors: John J. Duncan, Chattanooga, Tenn.; Alexander Kirjanov, S. Hamilton, Mass.

[73] Assignee: GAF Corporation, New York, N.Y.

[21] Appl. No.: 564,156

[22] Filed: Apr. 1, 1975

Related U.S. Application Data

[63] Continuation of Ser. No. 358,852, May 10, 1973, abandoned.

[51] Int. Cl.² ........................................... D06M 15/38
[52] U.S. Cl. ................................. 8/115.7; 428/290; 526/318
[58] Field of Search ................ 260/78.5; 8/115.7; 428/290; 526/318

[56] References Cited

U.S. PATENT DOCUMENTS

| 2,892,736 | 6/1959 | Johnson et al. | 117/138.8 |
| 3,245,933 | 4/1966 | Muskat | 260/29.6 |
| 3,342,787 | 9/1967 | Muskat | 260/78.5 |
| 3,392,155 | 7/1968 | Muskat | 260/78.5 |
| 3,442,698 | 5/1969 | Dill et al. | 117/155 |

OTHER PUBLICATIONS

Fieser and Fieser, Organic Chemistry, 2nd Ed. pp. 179–180, 1950.

*Primary Examiner*—John Kight, III
*Attorney, Agent, or Firm*—Walter C. Kehm

[57] ABSTRACT

Compositions, and methods for manufacture thereof, which impart an effective soil release finish to textiles of polyester-containing cellulosic fibers, comprising certain partial alkyl and alkoxyalkyl esters and mixed esters of interpolymers of maleic anhydride with unsaturated compounds, such as styrene and ethylene, and with polyvinyl alkyl ethers in which the weight percentage of esterified interpolymer is critical.

2 Claims, No Drawings

TEXTILE SOIL RELEASE COMPOSITION AND METHOD

This is a continuation of application Ser. No. 358,852, filed May 10, 1973, now abanonded.

BACKGROUND OF THE INVENTION

1. Field of the Invention

This invention relates to textiles containing polyester fibers and particularly relates to compositions which can impart soil-release properties to polyester fibers after application to the textile and curing. It specifically relates to compositions which are partially esterified interpolymers of maleic anhydride for use as soil release finishes.

2. Description of the Prior Art

Synthetic fiber-containing clothing has brought great changes in the textile industry, partly because these clothes can retain an initial crease and partly because they can be washed with water. Additional crease-retention is generally imparted by treating the textile, before manufacture of the clothing, with resins and curing the resin on the textile after creasing and pressing as desired, thereby providing the so-called "wash-and-wear" and "durable press" clothing so plentiful in the clothing industry. However, clothing articles which contain polyester fibers also have the disadvantage of more readily picking up soil, and especially oily soil, than does natural-textile clothing. Moreover, when washed in a home washing machine, the polyester-containing clothing may become progressively more heavily soil-laden with successive washings because soil which is dispersed in the wash water redeposits onto the washed clothing before the end of the wash cycle.

The oleophilic and hydrophobic properties of linear polyester fibers, which are normally blended with cellulosics such as cotton and rayon, are responsible for this redeposition behavior. These polyester fibers actually seem to scavenge oily soil from the wash water. Aminoplast resins used in durable press finishing also have a tendency to retain oil-and water-borne stains. The combination of fairly high resin loads and high polyester content creates a serious soil retention problem for durable-press garments and other textile articles.

This behavior of polyester-containing textiles and several attempts to solve the problem are discussed in considerable detail in U.S. Pat. No. 3,377,249. In general, these prior attempts to improve the soil-resisting properties of polyester-containing cellulosic fabrics have used nitrogen-containing resins to impart hydrophilic qualities to the polyester fibers. The above-mentioned patent also discloses the application of aminoplast resins, in combination with a catalyst and a synthetic acid-emulsion polymer based on arcylic acid, to a textile which contains linear polyester fibers, whereby soil-release and durable-press characteristics are imparted thereto. However, these new developments have not completely solved the problem.

Several textile finishing compositions which counteract the soil-retention tendency of polyester-containing fabrics are now on the market. The two leading commercial types of soil-release textile finishes are the acrylic-emulsion type, such as Rhoplex SR-488, and the fluorocarbon-based type, such as 3M Scotchgard. The composition of the instant invention forms a third and advantageous type.

SUMMARY OF THE INVENTION

Accordingly, one object of this invention is to provide a new composition of matter which is capable of imparting a high degree of soil resistance to cellulosic textiles containing polyesters.

Another object is to provide a method which is readily controllable and reproducible for manufacturing the novel, soil-resistant compositions of this invention.

Other objects and advantages of the invention will become apparent as the description thereof proceeds.

In satisfaction of the foregoing objects, the present invention provides novel compositions of matter which comprise certain partial alkyl and alkoxyalkyl esters and mixed esters of interpolymers of maleic anhydride or maleic acid with unsaturated compounds such as styrene and ethylene and with polyvinyl alkyl ethers, these novel compositions being hereinafter termed generally as partially esterified maleic interpolymers

DESCRIPTION OF THE INVENTION

The compositions of this invention are prepared by:

A. Reacting and interpolymerizing maleic acid or maleic anhydride with a mono-unsaturate which has the unsaturation adjacent to a terminal carbon atom according to the formula:

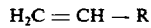

$$H_2C = CH - R$$

in which R is selected from the class consisting of:
1. an alkoxy group of one to about seven carbon atoms, preferably methoxy,
2. hydrogen,
3. an alkyl group of 1 to 4 carbon atoms, and
4. an aryl group having a total of 6 to 11 carbon atoms in which the aryl group is a phenyl or naphthyl group of alkyl-substituted derivative thereof;

B. Esterifying the resulting interpolymers with an alcohol having the formula: $R_1OH$, which is selected from the group consisting of:
1. a monohydric alkyl alcohol, in which $R_1$ is an alkyl chain having from 1 to 7 carbon atoms, such as methanol, ethanol, isopropyl alcohol, n-propyl alcohol, n-butanol, etc.,
2. an alkoxyalkyl alcohol in which $R_1$ is represented by the formula: $R_2-(O-C_2H_4-)_m$ in which $R_2$ is an alkyl chain having from 1 to about 30 carbon atoms, and $m$ is an integer of 1 to about 10, such as methoxyethyl (methyl cellosolve), methoxypolyethyleneoxyethyl, ethoxyethyl, polyethyleneoxyethyl, propoxypolyethyleneoxyethyl, ect. and
3. mixtures of 1 and 2; and C. Back-hydrolyzing the resulting esterified interpolymer to an ester content which is 10 to 50% and preferably between 10 and 50% of the available carboxyl groups or water during esterification.

Water-soluble, linear, resinous interpolymers of alkyl vinyl ethers, mono-olefins or aryl olefins with maleic anhydride may be made according to step (A) by using procedures discussed by C. E.Schildknecht in "Vinyl and Related Polymers", page 602, et seq. These reactions may be carried out using essentially molar ratios of 1:1 of the starting materials and conducted by bulk or solution polymerization in the presence of mild Friedel-Crafts catalysts at temperatures ranging from 0° to 100° C. Compounds which may be used to react with the maleic anhydride are the vinyl alkyl ethers, such as methylvinyl ether, ethylvinyl ether, etc., olefins such as ethylene, propylene, butylene, etc., or arylolefins, such as styrene. The resulting polymeric products have molecular weights ranging from about 156,000 to about 4,000,000. Structurally, these interpolymers can be represented by the following formula:

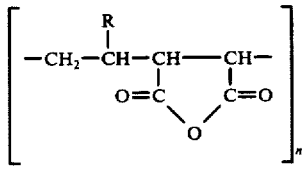
I.

wherein $n$ has a value of from about 1000 to 25,000 and R is alkoxy (prepared with an alkyl vinyl ether), alkyl or hydrogen (prepared with a mono-olefin) or aryl (prepared with an aryl olefin such as styrene). Such products are usually designated in terms of specific viscosity which is considered to be the most accurate available index for polymer identification. Thus, expressed in terms of specific viscosity, the products encompassed by the above formula possess an nsp value, as measured at a one-gram concentration in methyl ethyl ketone at 25° C., which is within the range of from about 0.1 to about 3.5, with a range of 0.2 to 1.5 being preferred.

These compounds are then esterified according to step (B) by reaction with one of the alcohols or alkoxyalkylalcohols mentioned, preferably employed in excess, by heating at an elevated temperature, usually at reflux, until complete solution in the alcohol-blend or alcohol is obtained. At this point a sample of the alcoholic solution exhibits poor dispersability in water.

At this point of the reaction, the half-ester product is an intermediate polymer which may be described by the following formula:

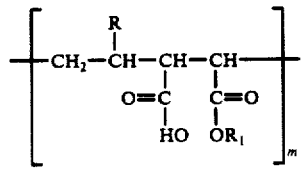
II.

wherein $n$ is as above, R is as above, and $R_1$ is alkyl or alkoxyalkyl of the formula:

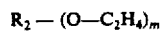

wherein $R_2$ is as above, and $m$ is as above.

Thereafter in Step (C), this esterified polymer is hydrolyzed by heating in the presence of water and optionally an acidic or alkaline catalyst until partial back-hydrolysis of the ester is effected. The resulting compound may be described by the following formula:

wherein R and $R_1$ are as above, the sum of $x$ and $y$ together representing 100 with $x$ being about 10 - 50% by weight and $y$ being the remainder. Thus, in this product the value of $x$ represents about 10 to 50% by weight of the total product and $y$ represents about 90 - 50% by weight.

In conducting the back hydrolysis reaction, the esters of formula II are heated in the presence of water, preferably in the presence of a catalytic amount (e.g. 0.01 to 5% by weight) of an acid catalyst, to form the partial esters of formula III, until the resulting product is water dispersible. Acid catalysts which can be used include methane sulfonic acid p-toluene sulfonic acid and mineral acids such as sulfuric acid, hydrochloric acid and the like. Also the acid number of the product will of course always be higher. In this regard, it should be noted that the acid number will necessarily decrease as the molecular weight of the half ester increases because of the particular starting materials employed.

In general, however, the back hydrolysis should be carried out until the product becomes water dispersible and the acid number is at least 5% higher than the theoretical acid number of the full half ester. However, hydrolysis should preferably be halted when less than 40% of the acid groups remain esterified.

After completion of the reaction, the partially hydrolyzed half esters of the above formula III will have a pH in water in the range of about 2.2 to 2.9. However, as many of the fabric softeners used with permanent press finishes are not compatible with strongly acid materials, it is usually advisable to add sufficient base (e.g. sodium hydroxide) to bring the pH up to about 4.0. At this pH, the product is compatible with all material presently added to permanent press formulations.

It is important to note that the products of the invention cannot be made satisfactorily except by the esterification and back-hydrolysis technique. Thus, attempts to esterify a methyl-vinyl-ether/maleic-anhydride interpolymer, having an nsp value of 0.1 to 0.5, so that at least 40% but less than 50% of the acid groups were esterified, by using smaller amounts of alcohol for esterification in an inert solvent system (such as acetone), did not provide satisfactory products.

Also, attempts to bring the $x$ value into the range of 1 - 40% by transesterification of a full half ester of the maleic-anhydride/polyvinyl methyl-ether interpolymer with the unesterified polymer did not produce a satisfactory product.

In the examples, the following trademarks and abbreviations are used for simplicity and convenience:

| | |
|---|---|
| Dacron: | A polyester fiber manufactured by E. I. duPont de Nemours & Co. |
| Methyl Cellosolve: | $HOCH_2—CH_2—OCH_3$ |
| Aerotex 101: | A modified glyoxal-type aminoplast resin manufactured by American Cyanamid Co. |
| Catalyst MI: | A magnesium-based resin catalyst manufactured by GAF Corporation. |
| Alipal CO-433: | An anionic surfactant manufactured |

III.

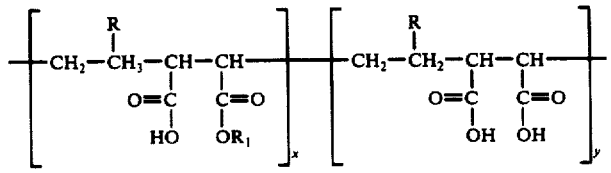

| | |
|---|---|
| | by GAF Corporation. |
| Karaset 1452: | A textile carbamate resin, manufactured by Refined Onyx Division, Millmaster Onyx. |
| Catalyst 341: | An acid salt catalyst manufactured by Refined Onyx Division, Millmaster Onyx. |

The following four examples show methods of manufacturing the partial esters of this invention, beginning with a methyl-vinyl ether/maleic-anhydride interpolymer having an nsp of 0.1 to 0.5 and hereinafter designated as methyl interpolymer.

EXAMPLE 1

The reaction was conducted in a 4000 ml. flask fitted with a thermometer, reflux condenser, and mechanical stirrer. The flask was heated by hot water. The flask was charged with:

methyl interpolymer: 468 grams
methanol: 900 grams

The resulting slurry was stirred and was slowly heated to reflux at 67° C. The slurry became very viscous and then dissolved. The temperature was held at reflux for 3½ hours. At this point the product would not disperse in water, but would accept water. (Note: the product at this point was a partial monoester in which $CH_3$ as the $R_2$ group was above 40 weight percent.) Water (700 grams) was added slowly to the solution with continued stirring and heating. The mixtue was held at reflux temperature (78° C.) for 1½ hours. The product at this point was still not water dilutable. An additional 600 grams of water was added and heating was resumed at reflux for 1½ hours longer. The dilutability of the mixture in water was still not satisfactory. At this point 0.08 percent methane sulfonic acid (70°) was added and heating at reflux was continued for one additional hour. At this point the product was water dispersible and compatible with aminoplast/catalyst systems.

Acid value (found) = 318.5.

EXAMPLE 2

The reaction was conducted in a 4000 ml. flask fitted with a thermometer, reflux condenser and mechanical stirrer. The flask was charged with:

methyl interpolymer: 468 grams
methyl cellosolve: 1144 gram

The resulting slurry was stirred and slowly heated to 90°-98° C. The slurry became viscous and then dissolved. Heating time was 3 hours at 90°-98° C. At this point the product was not water soluble but accepted water. Water (554 grams) was added to 100° C. and heating was continued for 1½ hours. At this point the product was water dispersible and compatible with aminoplast/catalyst systems.

EXAMPLE 3

Equipment was the same as in Example 2. The flask was charged with:

methyl interpolymer: 468 grams
methanol: 876 grams
methyl cellosolve: 228 grams

The resulting slurry was stirred while heating to a reflux temperature of 68° C. The slurry became very viscous and slowly dissolved. The mixture was heated at reflux (68° C.) for 3½ hours. The flask was then rigged for distillation and 309 grams of solvent (primarly methanol) was removed. At this point the product was not water soluble, but accepted water. Water (300 grams) was slowly added with stirring and the solution was heated under reflux at 80°-85° C. for one hour. The solution was then cooled and 200 grams of additional water was added. The resulting solution was dispersible in water, and compatible with resin/catalyst systems.

Acid value (found) = 280.4

EXAMPLE 4

The reaction was conducted in a 4000 ml. flask fitted with a thermometer, reflux condenser and mechanical stirrer. The flask was heated by hot water. The flask was charged with:

methanol: 700 grams
metyl cellosolve: 200 grams
methyl interpolymer: 468 grams

The resulting slurry was stirred and heated to reflux temperature (68° C.). The slurry became very viscous and then slowly dissolved. The mixture was held at reflux temperature for a total of 4½ hours. At this point, 1400 grams of water and 2 grams of methane sulfonic acid were added. While stirring the temperature was increased to 82° C. and held for 2½ hours. The reaction product was then cooled to room temperature. At this point, the product was water dispersible.

Acid value (found) = 284.8

The following four examples demonstrate the effectiveness of the products of this invention when applied to and cured on a polyester-containing cellulosic textile which is then subjected to standard soiling tests.

EXAMPLE 5

(Application of Partial Ester Composition Produced in Example 1)

The textile having soil release properties imparted thereto by the aforedescribed composition is dried and cured at about 300° F. to about 600° F. for about 10 seconds to about 20 minutes.

Swatches of 50/50 white Dacron-cotton fabric and 65/35 tan Dacron-cotton fabric were padded with solutions of the following compositions (by weight):

25% Aerotex 101
4% Catalyst MI
20% Composition produced in Example 1 at 21% solids — (omitted on control samples)
0.5% Alipal CO-433
69.5–49.55 Water All swatches were dried and then cured at 340° F. for 2½ hours. Cured fabrics were then stained with mineral oil, lipstick, Russian dressing, used crank case oil, mustard, and Wesson oil. The stained samples were allowed to condition at room temperature for approximately two hours and then were washed at 140° F. in an agitator washer (Kenmore) using "Tide" detergent, rinsed, and dried. In all cases, the samples treated with the composition of Example 1 had significantly less residual stain than the control samples.

All samples were then washed for an additional four laundry cycles at 140° F., rinsed each time, and dried. All swatches were then stained as before, conditioned, and washed one additional cycle at 140° F. In all cases, the samples treated with the composition of Example 1 had significantly less residual stain than the control samples.

EXAMPLE 6

After the swatches had been stained with the same materials in Example 5, except that Karaset 1452 and Catalyst 341 were used in place of Aerotex 101 and Catalyst MI, respectively, and according to the same procedure comprising drying, curing, staining, a quintuplicate cycle of washing, rinsing, and drying, re-staining, washing, rinsing, and drying again, there was significantly less residual stain on the swatches which had been treated with the composition of this invention than on the control swatches.

EXAMPLE 7

The materials and procedure were the same as Example 5 except that the composition of Example 3 was used in place of the composition of Example 1. After staining, a quintuplicate cycle of washing, rinsing, and drying, re-staining, washing, rinsing, and drying again, there was significantly less residual stain on the swatches which had been treated than on the control swatches.

EXAMPLE 8

The materials and procedure were similar to Example 5 except that the composition of Example 1 was not included in first padding solution for test or control samples. After curing, test samples were rinsed with plain water, dried and then padded with a mixture of water as 80% and the composition produced in Example 1 as 20%. The padded test samples were dried and then cured at 340° F. for 1½ minutes. Control samples were cured at 340° F. for 1½ minutes additional. Staining and washing cycles were the same as in Example 5. There was significantly less staining on the test samples than on the control samples.

The compositions which are described hereinbefore are novel water dispersions of partial alkyl and alkoxyalkyl esters of maleic interpolymers which are compatible with aminoplast resins and combine therewith to impart improved crease retention to polyester-containing cellulosic textiles in addition to improved soil-releasing capability. What is considered to lie within the scope of the invention is defined by the appended claims.

What is claimed is:

1. A polyester-containing cellulosic textile having thereon a cured soil-release composition which imparts soil-release properties thereto, comprising said soil-release composition having been applied to said textile and cured thereon, the latter composition comprising partial alkyl and oxyalkyl esters having the formula:

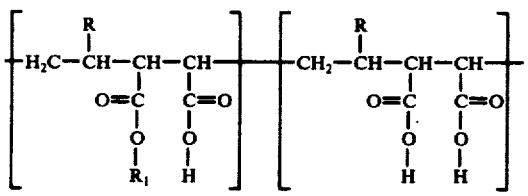

wherein R is an alkoxy group of 1 to about 7 carbon atoms, $R_1$ is selected from the group consisting of an alkyl chain having from 1 to 7 carbon atoms, an oxyalkylene chain having the formula:

$$R_2-(O-C_2H_4-)_m$$

in which $R_2$ is an alkyl chain having from 1 to about 30 carbon atoms and $m$ is an integer of 1 to about 10, and mixtures thereof; $x$ is between 40% and 50% by weight; $y$ is between 50% and 60% by weight; and $x + y = 100\%$ by weight, said interpolymer being water-dispersible, having an acid number at least 5% higher than the theoretical acid number of the full half ester, and an nsp value of from about 0.2 to 3.5, based upon the specific viscosity of a one-gram concentration of said interpolymer in methyl ethyl ketone at 25° C., the pH of said interpolymer composition in water ranging from between 2.2 and about 4.0 and being controlled, as required, through the addition of a base.

2. A polyester-containing cellulosic textile according to claim 1 which is cured at about 300° F to about 600° F for 10 seconds to 20 minutes.

* * * * *